United States Patent
Schulze

(10) Patent No.: US 6,263,069 B1
(45) Date of Patent: Jul. 17, 2001

(54) IMPACT ACTIVATED TELEPHONE METHOD AND APPARATUS

(75) Inventor: Herbert C. Schulze, Reno, NV (US)

(73) Assignee: Dynachieve, Inc., Reno, NV (US)

( * ) Notice: Subject to any disclaimer, the term of this patent is extended or adjusted under 35 U.S.C. 154(b) by 0 days.

(21) Appl. No.: 09/122,459

(22) Filed: Jul. 24, 1998

Related U.S. Application Data

(63) Continuation of application No. 09/085,328, filed on May 26, 1998.

(51) Int. Cl.[7] .................................................. H04M 1/26
(52) U.S. Cl. .......................... 379/352; 379/45; 379/355; 340/825.64; 455/422
(58) Field of Search .................................. 379/352, 354, 379/355, 37, 38, 40, 45; 340/825.64, 426; 455/404, 422

(56) References Cited

U.S. PATENT DOCUMENTS

| Re. 34,677 | * | 7/1994 | Ray et al. ............................... 379/37 |
| 4,137,429 | * | 1/1979 | Stockdale ............................... 379/42 |
| 4,237,344 | * | 12/1980 | Moore ..................................... 379/38 |
| 4,453,043 | * | 6/1984 | Zielinski et al. ....................... 379/52 |
| 5,465,296 | * | 11/1995 | McMonagle, Jr. et al. ......... 379/354 |
| 5,475,750 | * | 12/1995 | McMonagle, Jr. et al. ......... 379/355 |
| 5,475,751 | * | 12/1995 | McMonagle, Jr. et al. ......... 379/355 |
| 5,742,666 | * | 4/1998 | Alpert ................................... 455/404 |
| 5,896,565 | * | 4/1999 | Miller ................................... 455/404 |

* cited by examiner

Primary Examiner—Forester W. Isen
Assistant Examiner—Clark S. Cheney

(57) ABSTRACT

A method and apparatus for activating an emergency telephone mounted upon a structure, wherein the telephone is activated as a result of an impact by an object upon the structure causing the telephone to go off-hook active with immediate automatic connection to another telephone.

5 Claims, 3 Drawing Sheets

IMPACT ACTIVATED TELEPHONE METHOD AND APPARATUS

CROSS REFERENCE TO RELATED PATENT APPLICATIONS

This application is a continuation of Ser. No. 09/085,328 filed May 26, 1998.

BACKGROUND OF THE INVENTION

I. Field of the Invention

This invention is in the general field of emergency telephones, alarms and monitoring systems and equipment;

The invention is more particularly in the fields of emergency, ADA Compliant, and invalid telephones;

The invention is even more particularly directed to the field of such telephones which are activated overtly, or covertly, by mere disturbing or jarring of the telephone directly or indirectly.

II. Description of th Prior Art

There are many emergency telephone systems and devices, too numerous to detail here. All heretofore available emergency telephone and monitoring systems require installation of elaborate telephone or other equipment and a reasonable degree of mental/physical coordination for the pressing of buttons, or the like The present invention requires only a minute ability to contact, or move, a telephone to activate emergency telephone transmission and/or monitor a location, give the location, and enable one at a distance from the location to know the location and obtain knowledge of activities at the location of the telephone or monitor. The manner in which the present invention works is that a telephone or the like is activated by means of an impact upon the telephone or some other article associated with the telephone in such manner that impact upon the article is communicated to the telephone.

Except for my co-pending application for patent Ser. No. 09/085,328 referred to above, there is no prior art known to me in this latter described field. In that sense, there is no prior art.

SUMMARY OF THE INVENTION

There are many uses for emergency telephones, particularly ADA (Americans with Disabilities Act) compliant devices. Some examples of such uses are emergency telephones in elevators, emergency phone towers in public and remote areas, and the like. There are numerous other examples.

Heretofore systems for satisfying these needs all require expensive installation of equipment and they all require that a person activating the device must have some reasonable muscular ability and coordination to reach and press an activating button, lift a receiver, or some other such direct action.

One of the greatest deficiencies of the heretofore known emergency telephones is the inability of many permanently (or temporarily) disabled persons to activate such emergency telephones. For example, a perfectly healthy and able person in an area having an emergency telephone tower may fall an break a hip or suffer some other injury making it impossible to get to an upright position. Yet, such person may be able to crawl or drag himself or herself to the location of the emergency telephone tower only to be frustrated in attempts to get up to the telephone handset or activation button. With my present invention, such person need only to strike the tower to cause the emergency telephone to be activated. Then, such person may shout, or speak loudly enough to explain the predicament. Note that in this example the telephone may even be activated from a distance by a person who cannot even crawl to the tower by throwing a rock and hitting the tower from a distance.

Another example would be a person (of which there are many) who cannot lift an arm and is confined to a motorized wheelchair which can be operated by various mechanisms (a head mounted control for example, or other mechanisms). Such a person may need to use an emergency telephone for various reasons, such as an elevator emergency telephone, or other emergency type telephone but cannot reach up to press a button or lift a handset. With my present invention, all such person would need to do would be to run the wheelchair into a structure (a wall, a pedestal, tower, etc.) where the telephone of this invention is mounted.

One additional problem encountered with emergency telephone, particularly towers in remote locations and otherwise, is vandalism. My present invention will be a great deterrent to vandalism. If a vandal commences to vandalize an emergency telephone of this invention, the telephone and any auxiliary device such as a strobe light, siren, etc. will be activated. This will effectively bring authorities to the scene and will undoubtedly cause the vandal to make a rapid exit.

I have accomplished this by inserting an impact activated arrangement into the telephone circuitry in such manner that the telephone is always ready to go to off-hook (activated) condition, except that the power circuit to the telephone is interrupted by means to turn the power on activated by an impact sensing arrangement which turns on the phone power and maintains it on until a reset arrangement is activated either manually or by an automatic timing arrangement.

It is an object of this invention to provide an emergency telephone which can be activated by persons unable to press a button or lift a handset or the like;

It is another object of this invention to provide an impact activated emergency (or non-emergency) telephone;

Another object of this invention is to provide an impact activated telephone which may be activated by impact to another article with which such telephone is associated;

Another object of this invention is to provide an emergency telephone which will be activated in case of vandalism;

Another object of this invention is to provide such an impact activated telephone which may be activated by collision of an object activated by a disabled person.

The foregoing and other objects and advantages of this invention will become clear to those skilled in the art upon reading the description of a preferred embodiment, which follows, in conjunction with a review of the appended drawings.

DESCRIPTION OF A PREFERRED EMBODIMENT

Inventory of items identified by numeral:

| Numeral | Item |
| --- | --- |
| 10 | customary emergency telephone tower |
| 11 | strobe light |
| 12 | emergency telephone |
| 13 | base surface |
| 14 | connection of tower to base |
| 16 | telephone activation button |
| 18 | telephone mounting area on tower |
| 20 | handicapped individual |
| 22 | individual's arm |
| 24 | individual's finger |
| 30 | wheelchair |
| 110 | emergency telephone tower using this invention |
| 111 | strobe light |
| 112 | telephone of this invention |
| 113 | base surface |
| 114 | connection of tower to base |
| 118 | telephone mounting within tower |
| 119 | acoustic panel |
| 120 | injured individual on base surface |
| 122 | individual's arm |
| 124 | individual's fist |
| 130 | force of fist impact on tower |
| 140 | latching relay set coil |
| 141 | latching relay reset coil |
| 150 | telephone line power |
| 151 | first leg of telephone power |
| 152 | second leg of telephone power through latching relay |
| 153 | first power lead for set and reset coils |
| 154 | second power lead for set and reset coils |
| 155 | second leg of telephone power to latching relay |
| 156 | second power lead to impact switch |
| 157 | lead from impact switch to set coil |
| 158 | second power lead to reset switch |
| 159 | reset switch lead to reset coil |
| 160 | impact switch |
| 170 | reset switch |
| 180 | normally open timer switch |
| 181 | lead between two timers |
| 182 | lead from latching relay to timer 180 |
| 183 | latching relay contact |
| 184 | latching relay latch |
| 185 | one segment of latching relay |
| 186 | one segment of latching relay |
| 190 | normally closed timer switch |
| 191 | connection between timer and reset coil |

Figure 1:
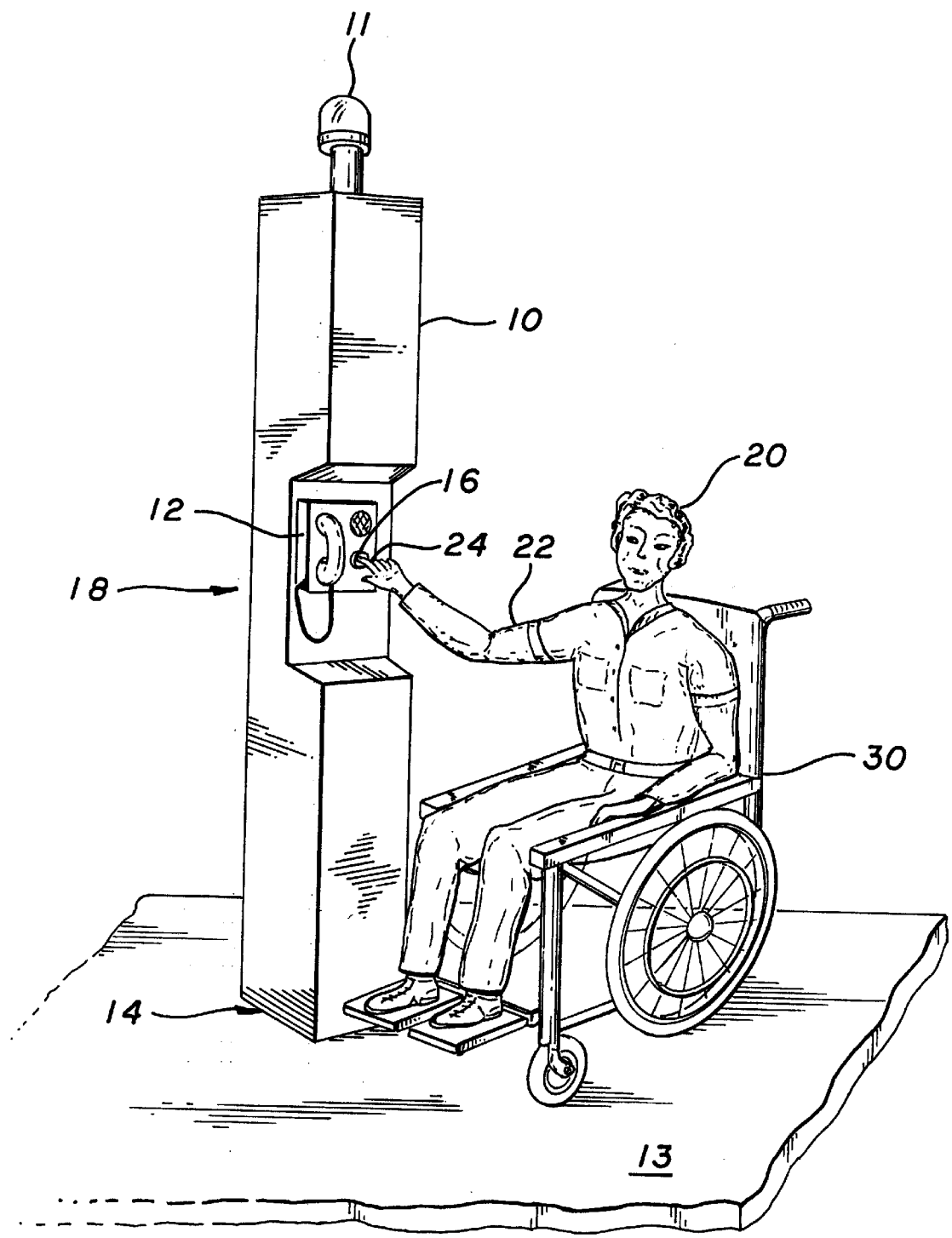
FIG. 1 is a schematic perspective of a person using an emergency telephone tower with the heretofore known features.

Examining FIG. 1, a customary emergency telephone tower 10 is shown mounted at 14 to a base surface 13. This mounting will normally be very strong and secure. The telephone tower will frequently have a strobe light 11 at the top. The strobe will usually activate upon activation of the telephone 12 which is mounted within a mounting recess 18 in the tower. There will normally be a button or key 16 which must be manipulated in order to activate the phone.

An invalid 20 is shown in wheelchair 30. The invalid is required to reach up with the invalid's arm 22 and use finger 24 to press or otherwise activate the telephone.

If a person (invalid or not) has an impairment which limits the arm motion (a common occurrence) it will not be possible to activate the emergency telephone.

There are many emergency telephones in other settings which basically operate in the same manner as that illustrated. Emergency telephones in elevators, dark corridors, basements, etc. all work in a similar manner, as do monitoring telephones for invalids confined to their homes and similar situations. If persons do not have proper control of their limbs it is very difficult, if not impossible, to use such telephones.

Figure 2:
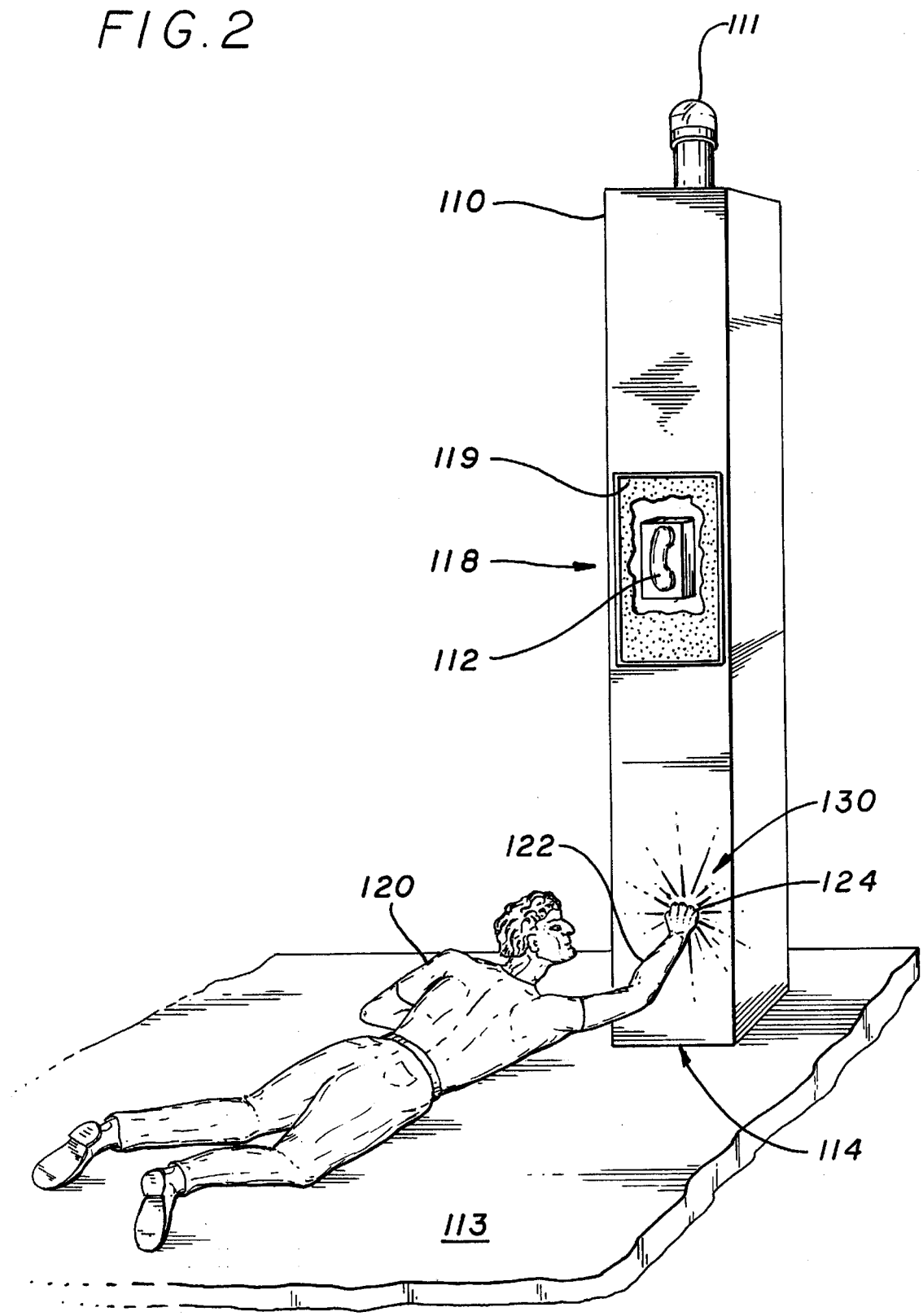
FIG. 2 is a schematic perspective of a person using a telephone tower with the features of this invention.

FIG. 2 shows an emergency telephone tower utilizing a telephone of the present invention, suitable to practice the method of this invention. An emergency telephone tower 110, mounted to base surface 113 at 114 is shown. Strobe light or the like 111 is mounted to the top of the tower. An impact activated telephone 112 of this invention is mounted within the tower at 118. An acoustic panel 119 will allow sound to be received and transmitted from outside the tower.

An injured person 120, unable to get up, has crawled, or dragged him/herself to the tower. Now the person need only to strike the tower with an arm 122 and fist 124. This striking will create a sufficient disturbance of the impact sensing device (switch) associated with the telephone to activate the telephone. The injured person will be able to shout or speak and be heard by one at the other end of the emergency phone connection.

While I have illustrated striking the tower with a fist, many other methods could be used. A rock could be thrown against the tower, it could be run into by a wheelchair, it could be hit with a cane, it could be kicked, etc.

The same basic telephone can be used in virtually limitless situations such as elevator telephones, cellar telephones, monitoring telephones, etc.

Figure 3:
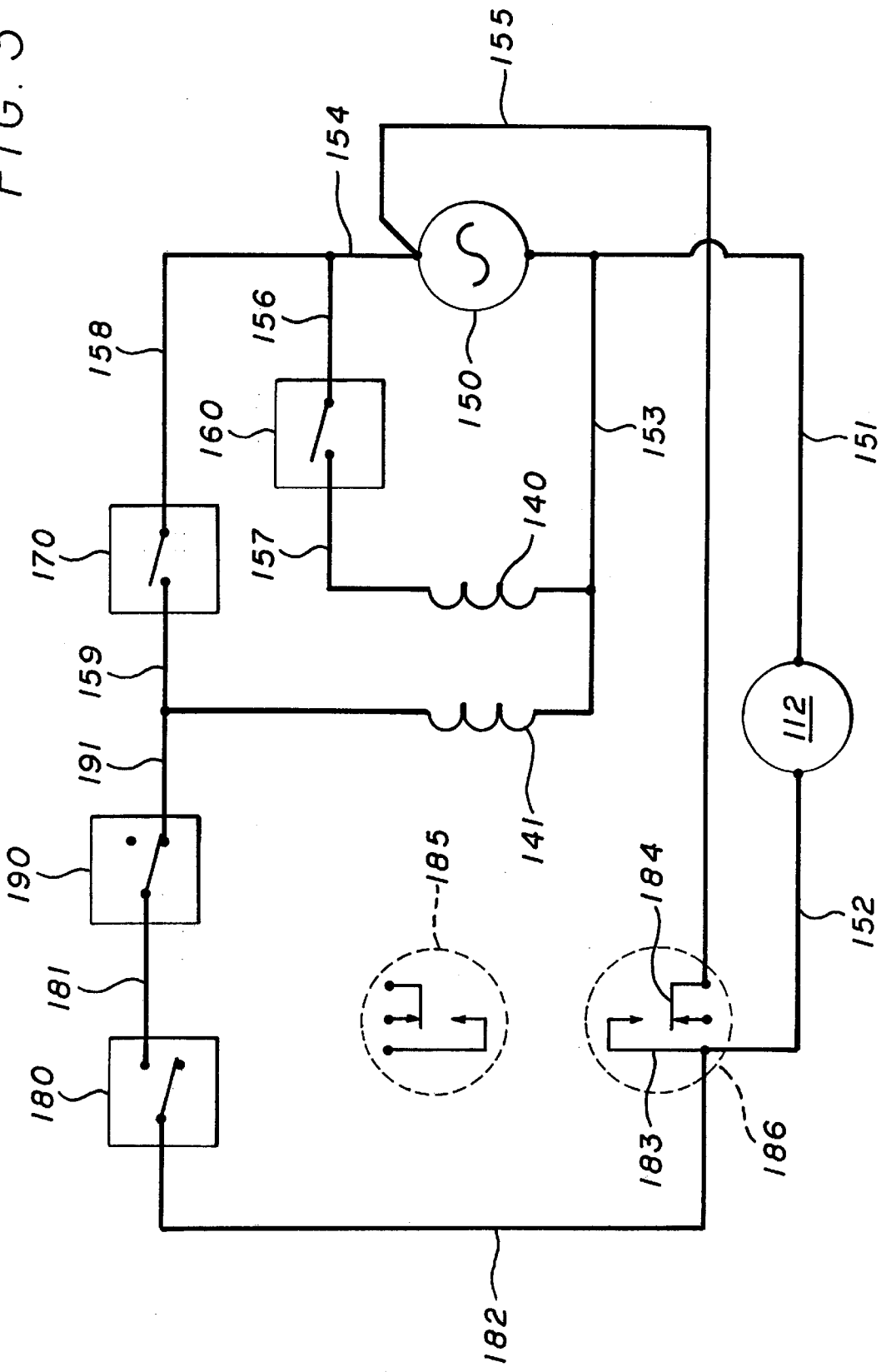
FIG. 3 is a schematic diagram of circuitry and elements which will enable the practicing of the method of this invention.

FIG. 3 illustrates one circuit for accomplishing the impact activation of a telephone. The telephone 112 is powered by two legs of power 151 and 155 of telephone line power 150 received through two of the wires of a regular modular telephone cord or otherwise. One, or both of the power legs will be interrupted, going first to an appropriate relay or latching relay. In the circuitry shown here, the 155 power leg is interrupted, going first to latching relay segment 186 which is normally open and will be closed by reason of an impact as described below in order for the telephone line power 155 to travel through the now closed latching relay segment to telephone 112 through lead 152.

The telephone's handset has been always in an inactive condition (the power is not on) so that when the power reaches the telephone 112 it is immediately in a dial tone (off-hook active) condition. Using an automatic dial of the telephone a predetermined number can be dialed. Alternately, a hot shot dialer such as Viking Electronics of Hudson Wisconsin model K-1900-5 can be used. Thus, immediately upon power being supplied to the telephone it will dial the appropriate number or will connect automatically to a pre-set location as known to those skilled in the art.

First power lead 151 is also connected at 153 to one pole of the set and reset coils 140 and 141 of the latching relay. Second power lead 154 is connected at 156 to impact switch 160, in turn connected at 157 to the second pole of the set coil 140. Second power lead 154 is also connected at 158 to momentary contact switch 170 through which power can be delivered to the second pole of reset coil 141.

An auxiliary circuit 182 can activate normally open timer 180 after a predetermined time. This will in turn pass power through 181 to normally closed timer 190 which will open for a very short predetermined time in order for the reset coil to be activated momentarily to reset the latching relay for its next activation occurrence.

The impact switch can be of different types and different sensitivities as known to those skilled in the art. I have found that mercury splash impact switches from Select Controls, Inc. of Bohemia, New York can be obtained in virtually any degree of sensitivity desired. For some uses a very sensitive impact switch may be desired. For example, an impact switch suitable to be used by a paraplegic may be so sensitive as to be activated by a tap of a persons head. On the other hand it may be desired to have an impact switch which requires a very deliberate force to assure against accidental activation, sensitive enough to activate in case of vandalism to the telephone or equipment with which it is associated.

The action of jarring the telephone or an object with which it is associated will activate the impact switch 160, in turn activating the latching relay. This results in the telephone power activating the telephone. It will be noted that a second latch switch 185 is shown. This is shown since it is common for latching switches to be double pole double throw. The existence of the second latch switch makes it possible to also activate an independent alarm siren or other device if desired.

Different telephones have different circuitry. Those skilled in the art understand this and will be able make variations depending upon the particular telephone being used. It may be required that a suitable resistance or the like be inserted in the power circuit to adjust the voltage. Also, due to polarization, it may be required that a bridge rectifier or the like be employed in the circuit. All of these details will be understood by those skilled in the art and can be easily applied to any particular telephone circuitry by those skilled in the art.

It is important to understand that impact switches can be made extremely sensitive, requiring only the slightest movement to activate, or they can be made to require almost any required degree of shock to activate. For most uses a fairly sharp jolt, or jarring, may be desirable. This will avoid accidental and unintended activation such as could occur by someone accidentally bumping into a structure in which the telephone may be located. However, there are some important possible uses for extremely sensitive units. For example, sometimes persons who are mentally alert are, as a result of illness or accident, unable to move any part of their bodies with the exception of slight head and neck movement. In that case, an extremely sensitive unit could be placed very close to the person's head so that the person could activate the unit by a slight tap against the unit with the head.

I have described a particular impact activated telephone system in this specification. It must be understood that other types of telephone, such as cellular telephones can be activated by impact according to the teaching of this specification.

While the embodiments of this invention shown and described are fully capable of achieving the objects and advantages desired, such embodiments have been disclosed for purposed of illustration only, and not for purposes of limitation.

I claim:

1. An emergency telephone comprising:

a conspicuous telephone building structure;

a telephone mounted on said building structure, wherein said telephone comprises telephone circuitry without electrical power connected to said telephone circuitry;

impact sensing means mounted on said building structure; and means to connect electrical power to said telephone circuitry when the sensing means senses an impact upon said building structure.

2. The emergency telephone of claim 1 wherein means is provided to disconnect the electrical power from the telephone circuitry for after the electrical power has been connected to the telephone circuitry a predetermined period of time.

3. An emergency telephone system comprising: telephone means connected to building structure means; telephone electrical power means connected to said building structure means; impact-activated electrical switch means connected to said building structure means; electrically connecting means connecting said telephone electrical power means to said impact-activated electrical switch means; means connecting said impact-activated electrical switch means to said telephone means; and impact means comprising a human body part independent of said structure means capable of impacting upon said structure.

4. The method of activating an emergency telephone means comprising: installing normally open impact switch means in an electrical power circuit of an electrically powered emergency telephone means mounted upon an emergency telephone tower structure; and impacting the emergency telephone tower structure with a human body part.

5. The method of claim 4 wherein the emergency telephone means and the impact switch means are both connected to the same structure, and the impact by human body part is an impact deliberately and intentionally instituted by a human against the structure.

\* \* \* \* \*